United States Patent
Shumow et al.

(10) Patent No.: US 8,661,536 B2
(45) Date of Patent: Feb. 25, 2014

(54) SIDE CHANNEL ATTACK ANALYSIS

(75) Inventors: Daniel Bakalars Shumow, Seattle, WA (US); Peter L. Montgomery, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 496 days.

(21) Appl. No.: 12/725,476

(22) Filed: Mar. 17, 2010

(65) Prior Publication Data

US 2011/0228926 A1     Sep. 22, 2011

(51) Int. Cl.
*G06F 21/00*     (2013.01)

(52) U.S. Cl.
USPC .............. 726/22; 726/17; 726/25; 726/36; 713/161; 713/176; 713/340; 380/2; 380/28; 380/44

(58) Field of Classification Search
USPC .......................................... 726/22
See application file for complete search history.

(56) References Cited

U.S. PATENT DOCUMENTS

| | | | | |
|---|---|---|---|---|
| 5,081,677 | A * | 1/1992 | Green et al. | 380/281 |
| 5,631,960 | A * | 5/1997 | Likens et al. | 380/2 |
| 6,096,089 | A * | 8/2000 | Kageshima | 703/18 |
| 6,650,132 | B2 * | 11/2003 | Pelissier | 324/750.03 |
| 7,055,029 | B2 * | 5/2006 | Collins et al. | 713/161 |
| 7,142,670 | B2 | 11/2006 | Chari et al. | |
| 2005/0232430 | A1 * | 10/2005 | Gebotys | 380/286 |
| 2008/0022102 | A1 | 1/2008 | Venkatesan et al. | |
| 2008/0059711 | A1 | 3/2008 | McKeen et al. | |
| 2008/0082828 | A1 * | 4/2008 | Jennings et al. | 713/176 |
| 2008/0091975 | A1 * | 4/2008 | Kladko et al. | 714/25 |
| 2008/0162979 | A1 * | 7/2008 | Abernethy et al. | 713/600 |
| 2008/0307220 | A1 * | 12/2008 | Campbell | 713/155 |
| 2009/0010424 | A1 * | 1/2009 | Qi et al. | 380/28 |
| 2009/0013406 | A1 * | 1/2009 | Cabuk et al. | 726/22 |
| 2009/0183009 | A1 * | 7/2009 | Delfs et al. | 713/193 |

OTHER PUBLICATIONS

Kong, et al., "Deconstructing New Cache Designs for Thwarting Software Cache-based Side Channel Attacks", Retrieved at << http://www.cs.ucf.edu/~jfkong/CSAW08.pdf >>, Proceedings of the 2nd ACM workshop on Computer security architectures Conference on Computer and Communications Security, 2008, pp. 9.

Spadavecchia, Ljiljana., "A Network-based Asynchronous Architecture for Cryptographic Devices", Retrieved at << http://www.era.lib.ed.ac.uk/bitstream/1842/860/1/Spadavecchia_thesis.pdf >>, 2005, pp. 250.

Necula, et al., "CIL: Intermediate Language and Tools for Analysis and Transformation of C Programs", Retrieved at << http://citeseerx.ist.psu.edu/viewdoc/download?doi=10.1.1.143.7209&rep=rep1&type=pdf >>, Proceedings of the 11th International Conference on Compiler Construction, 2002, pp. 213-228.

(Continued)

*Primary Examiner* — Morshed Mehedi
(74) *Attorney, Agent, or Firm* — Holly Nguyen; Carole Boelitz; Micky Minhas

(57) ABSTRACT

A method described herein includes acts of executing a cryptographic function over input data utilizing a processor on a computing device and generating a data packet that indicates how the cryptographic function interacts with hardware of the computing device, wherein the hardware of the computing device comprises the processor. The method also includes acts of analyzing the data packet, and generating an indication of security of the cryptographic function with respect to at least one side channel attack based at least in part upon the analyzing of the data packet.

19 Claims, 8 Drawing Sheets

(56) References Cited

OTHER PUBLICATIONS

Bar-El, Hagai., "Known Attacks against Smartcards", Retrieved at << http://www.hbarel.com/publications/Known_Attacks_Against_Smartcards.pdf >>, Retrieved Date: Jan. 13, 2010, pp. 19.

Aciicmez, et al., "On the Power of Simple Branch Prediction Analysis", Retrieved at << http://eprint.iacr.org/20061351.pdf >> Cryptology ePrint Archive, Report 2006/351, 2006, pp. 1-16.

Hartog, et al., "PINPAS a Tool for Power Analysis of Smartcards", Retrieved at << http://citeseer.ist.psu.edu/cache/papers/cs/29730/http:zSzzSzwww.liacs.nlzSz~devinkzSzresearchzSzPostscriptzSzsec2003.pdf/pinpas-a-tool-for.pdf >>, Proceedings of SEC 2003, pp. 1-5.

Hollestelle, et al., "Power analysis on smartcard algorithms using simulation," Technical Report Eindhoven University of Technology. Retrieved at << http://doc.utwente.nl/66569/1/200422.pdf >>, 2004, pp. 1-40.

Kocher., "Timing Attacks on Implementations of Diffiee-Hellman, RSA, DSS, and Other Systems", Retrieved at << http://citeseer.ist.psu.edu/cache/papers/cs/12723/http:zSzzSzwww.cryptography.comzSzdpazSz..zSztimingattackzSztiming.pdf/kocher96timing.pdf >>, Advances in cryptology-CRYPTO, 1996. pp. 1-10.

Kocher, et al., "Differential Power Analysis", Retrieved at << http://www.cryptography.com/resources/whitepapers/DPA.pdf >> Advances in Cryptology-CRYPTO 1999. pp. 1-10.

Kocher, et al., "Introduction to Differential Power Analysis and Related Attacks", Retrieved at << http://www.cryptography.com/resources/whitepapers/DPATechInfo.pdf >>, Technical Report, 1998. pp. 1-5.

Micali, et al., "Physically Observable Cryptography", Retrieved at << http://eprint.iacr.org/2003/120.pdf >>TCC 2004, pp. 1-23.

Naor, et al., "Public-Key Cryptosystems Resilient to Key Leakage", Retrieved at << http://www.wisdom.weizmann.ac.il/~naor/PAPERS/leakage.pdf >>, Advances in Cryptology-CRYPTO 2009, pp. 1-39.

Percival, "Cache Missing for fun and Profit", Retrieved at << http://www.daemonology.net/papers/cachemissing.pdf >>, BSDCan '05, May 2005. pp. 1-13.

Molnar, et al., "The Program Counter Security Model: Automatic Detection and Removal of Control-Flow Side Channel Attacks", Retrieved at << http://www.cs.berkeley.edu/~dmolnar/papers/icisc05-camera.pdf >> Cryptology ePrint Archive, Report 2005/368, 2005. pp. 1-15.

* cited by examiner

SIDE CHANNEL ATTACK ANALYSIS

BACKGROUND

The term cryptography is used to refer to techniques for taking legible, readable data and transforming such data into unreadable data for the purpose of secure transmission. Upon the unreadable data reaching an intended destination, a key known only to the sender and legitimate recipients of the data can be utilized to transform the unreadable data back to a legible form. Modern cryptography systems are extremely complex, such that for many computer implemented cryptography systems, it is provably difficult to break such systems without knowledge of the key.

In the relatively recent past hackers discovered that some knowledge pertaining to a cryptography system, a key, or data desirably kept secret can be gleaned by monitoring physical implementation of the cryptography system with hardware of a computer. Thus, physical parameters pertaining to the hardware of a computing device can be monitored, such as an amount of time required to execute an instruction, an amount of power utilized to execute an instruction, etc., and these physical parameters can be utilized to break a cryptographic system. Obtaining information by monitoring physical implementation of a cryptography system and attempting to use such information to break the cryptography system is referred to as a side channel attack.

Types or classes of side channel attacks include timing attacks, power monitoring attacks, and acoustic attacks, amongst other attacks. A timing attack is configured to measure an amount of time required to perform certain computations on a computer and utilizing such time to ascertain some knowledge about a cryptography system and/or underlying data and/or a private key. A power monitoring attack monitors power consumption by hardware during computation of a cryptographic function and utilizing this varying power to learn something about the cryptography system. An acoustic attack refers to monitoring of sound produced by hardware of a computer during certain execution of certain instructions/computations to infer knowledge about a cryptographic system. These are but a few of the many currently implemented side channel attacks.

Conventional techniques for mitigating side channel attacks include developing cryptographic programs with constant memory access patterns. That is, the program must be implemented such that it accesses memory in a consistent pattern regardless of the underlying data. Another technique is to develop a cryptographic program such that there is constant program flow (there is no data dependent branching in the cryptographic program). Still further, some side channel attacks can be mitigated by utilizing top of the line hardware. Generally these methods for mitigating side channel attacks are not feasible because oftentimes individuals cannot choose the hardware that comes on the machine, and developing a program with constant memory access or with constant program flow can drastically negatively impact performance of an executing cryptographic function.

SUMMARY

The following is a brief summary of subject matter that is described in greater detail herein. This summary is not intended to be limiting as to the scope of the claims.

Described herein are various technologies pertaining to analyzing security of a cryptographic system executing on a computing device with respect to side channel attacks without executing an actual side channel attack on the cryptographic system. Specifically, systems and methods are described herein that can be utilized by developers of cryptographic systems to test such cryptographic systems for security with respect to one or more side channel attacks. Pursuant to an example, a program that calls a cryptographic function can be selected by a user. When the cryptographic function is called, execution of such function by a processor on a computing device can be monitored and data pertaining to such execution can be output. For instance, a software trace can be undertaken with respect to the cryptographic function executing on the computing device. This software trace can be generated, for example, through utilization of a tracing utility such as a debugger or program that is customized to monitor execution of cryptographic functions by a processor. Data output through monitoring the execution of the cryptographic function can include processor data for each instruction executed by the processor (time needed to execute an instruction, power needed to execute an instruction), memory locations accessed by the processor, data indicating whether the processor accessed a cache, amongst other information.

The developer may further select an analysis module that is configured to analyze the aforementioned output data. For instance, the developer may select an analysis module from amongst a plurality of analysis modules, wherein an analysis module can be configured to output data that is indicative of the security of cryptographic function executing on the computing device with respect to one or more side channel attacks. There can be at least two different classes of analysis modules: 1) a first class of analysis modules that can be employed to simulate the behavior of actual hardware including processors, memory, cache, etc. with respect to the cryptographic function being executed on such hardware; and 2) a second class of analysis modules that is configured to analyze the output data with respect to a theoretical model.

An analysis module of the first class can be configured to simulate one specific component/parameter of hardware. For example, by observing a record of memory accesses during execution of the cryptographic function, cache hits and misses can be simulated so as to evaluate leakage from a side channel pertaining to the cache. In another example, an analysis module of the first class can be configured to simulate state of a branch predictor, which can be simulated by recording a stream of instructions and branches in the cryptographic program. In yet another example, an analysis module of the first class can be configured to simulate power usage with respect to instructions executed during execution of the cryptographic function.

Analysis modules of the second class may be desirably selected, for instance, if the hardware used to execute the cryptographic function is overly complicated or unknown or the developer wishes to have some general guidance on structuring the cryptographic program. In an example, an analysis module of the second class can be configured to analyze the cryptographic function with respect to compliance with the program counter-model, which asserts that the program counter should advance in a substantially similar manner while executing a cryptographic function regardless of input to such function. Thus, such an analysis module can determine whether program flow of the cryptographic program is constant across different inputs. In another example, an analysis component of the second class can be utilized to analyze the cryptographic program in connection with a model that indicates that memory access is not to be conditional upon input data.

Analysis undertaken by an analysis module can be presented to a developer or a tester in any suitable form. For example, the analysis may be displayed in a graphical manner as data in the form of a message (e.g., "your cryptographic program is secure against a timing side channel attack") or some other form. Accordingly a cryptographic program can be tested for security with respect to side channel attacks without having to actually implement a side channel attack, which can be prohibitively expensive and time consuming.

Other aspects will be appreciated upon reading and understanding the attached figures and description.

DETAILED DESCRIPTION

Figure 1:
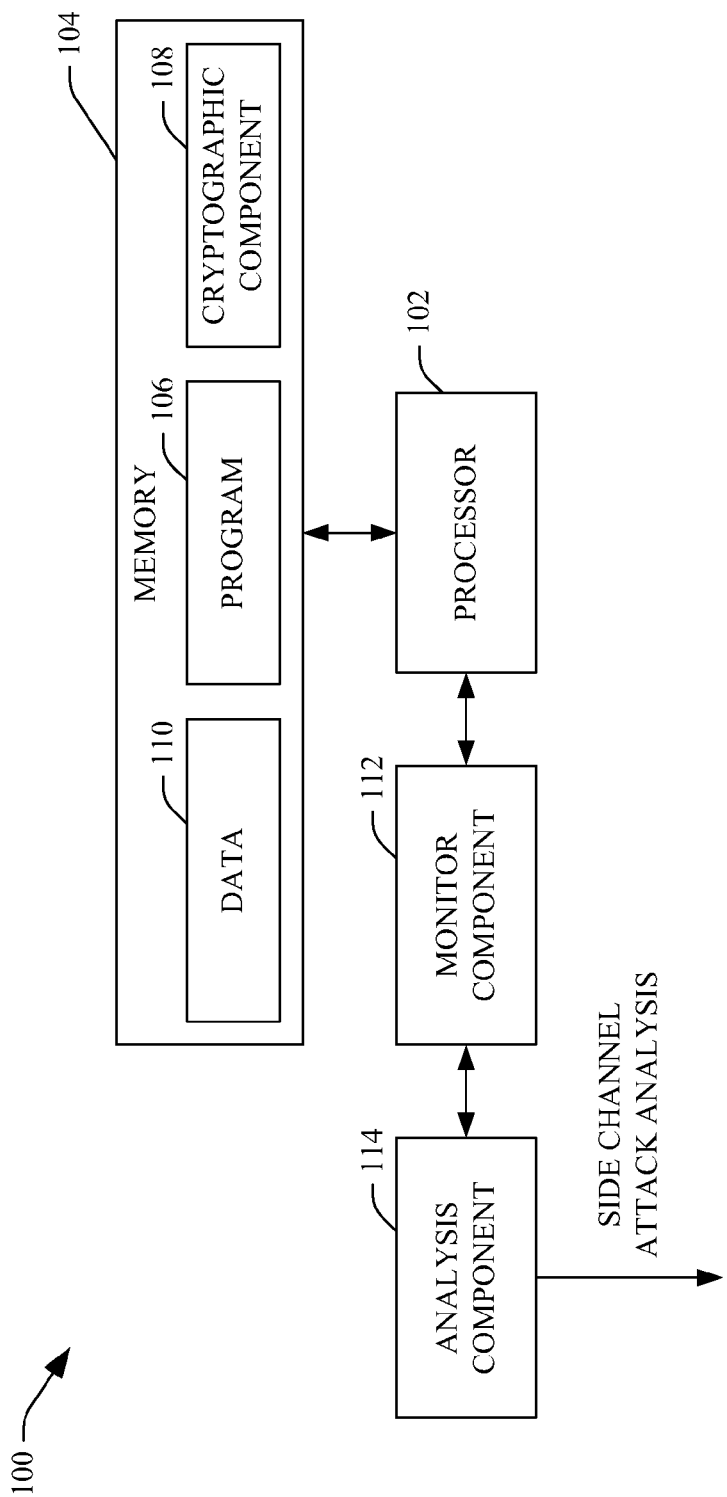
FIG. 1 is a functional block diagram of an example system that facilitates performing side channel attack analysis on a cryptographic function.

Various technologies pertaining to performing side channel attack analysis on cryptographic functions will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates performing side channel attack analysis on one or more cryptographic functions is illustrated. The system 100 comprises a processor 102 that can be configured to execute machine executable instructions. A memory 104 can be accessible to the processor 102 by way of any suitable communications medium such as a system bus. The memory 104 may be RAM, ROM, EEPROM or any other suitable type of memory that can be accessed by the processor 102. In an example, the processor 102 and the memory 104 may reside on any suitable computing device including but not limited to a mobile computing device such as a mobile telephone, a desktop computing device, a laptop computing device, a mobile media player, etc.

The memory 104 comprises a program 106 that can be executed by the processor 102. The program 106 may be any suitable program such as a program that facilitates transferring data from a source to a recipient, a word processing program, a spreadsheet application or any other suitable program. In a particular example, the program 106 may utilize any suitable communications protocol, such as Secure Sockets Layer (SSL), Transport Layer Security (TLS), Kerberos, Local Security Authority (LSA), or the like. A cryptographic component 108 can be called by the program 106 when the program 106 is executed by the processor 102. The cryptographic component 108 is intended to encompass a cryptographic system (a crypto system), a cryptographic function, program, etc. For instance, the cryptographic component 108 may be a public key cryptographic system. The memory 104 further comprises data 110 that is accessed by the cryptographic component 108 and operated on by such cryptographic component 108 to generate encrypted data. Specifically, the data 110 may be data that is desirably encrypted or kept secret from a third party.

A monitor component 112 is in communication with the processor 102 and can monitor execution of the program 106 by the processor 102, and thus can monitor execution of the cryptographic component 108 over the data 110. For instance, the monitor component 112 can be a program that is retained in the memory 104. In an example, an application programming interface (API) corresponding to a tracing utility such as a debugger can be utilized to implement the monitor component 112, thereby allowing the monitor component 112 to "hook" into the program 106 as it is executed by the processor 102. The monitor component 112 can be configured to record each processor instruction during execution of the program 106 by the processor 102, wherein the processor instructions can include type of instruction, a time corresponding to execution of an instruction, memory accesses pertaining to an executed instruction (whether memory was accessed, locations in memory that were accessed, whether the access was to a cache, etc.). In an example, the monitor component 112 can be configured to output processor state by processor state for each instruction executed by the processor 102. In another example, the monitor component 112 can be configured to output a data packet that comprises a plurality of processor states recorded during execution of the cryptographic component 108 with respect to the data 110. While the monitor component 112 has been described in the context of a debugger, it is to be understood that the monitor component 112 may be implemented in any suitable manner, including as a standalone program that is configured to monitor execution of cryptographic functions over data by the processor 102.

An analysis component 114 can be in communication with the monitor component 112 and can receive data packets output by the monitor component 112 pertaining to states of the processor 102 when executing the cryptographic component 108 over the data 110. The analysis component 114 can be configured to perform side channel attack analysis with respect to the execution of the cryptographic component 108 by the processor 102 on a computing device. The analysis component 114 can be configured to perform one of at least two types of side channel attack analysis: 1) the analysis component 114 can be configured to simulate a particular type of side channel attack with respect to the cryptographic component 108 being executed by the processor 102; or 2) the analysis component 114 can be configured to analyze the data output by the monitor component 112 with respect to some theoretical model.

Accordingly, the analysis component 114 can have access to a model of at least one physical parameter of the processor 102 and/or the memory 104. The analysis component 114 can receive the recorded data output by the monitor component 112 and can simulate a side channel attack by applying the model of the at least one physical parameter of the processor 102 and/or the memory 104 to the output data. For instance, such model may be a model of the power consumed by the processor 102 for different types of instructions executed by the processor 102. The analysis component 114 can apply such model to the instructions recorded by the monitor component 112 and can thus simulate a side channel attack with respect to power consumption of the processor 102 when executing the cryptographic component 108 over the data 110. Of course, the analysis component 114 may have access to any suitable model of a physical parameter of the processor 102 and/or the memory 104. Such parameters that can be modeled may be or include audible sounds output by the processor 102 when executing instructions, power consumed by the processor when executing instructions, time required to execute certain instructions, cache hits and misses, etc.

Alternatively, the analysis component 114 can be configured to analyze execution of the cryptographic component 108 by the processor 102 with respect to some theoretical model. This type of analysis can be useful if the underlying hardware (processor and memory) is overly complicated or unknown. Thus, the analysis component 114 can be configured, in an example, to analyze execution of the cryptographic component 108 by the processor 102 in comparison to the program counter model, which asserts that the program counter should advance consistently while executing a cryptographic function regardless of data input to such function. This analysis can capture the idea that the program flow should be constant across inputs. It is to be understood that, in some instances, the program counter may vary depending upon length of data operated upon by the cryptographic function and/or length of a cryptographic key, and timing may vary depending upon other processes being executed and system interrupt codes. In another example, the analysis component 114 can analyze execution of the cryptographic component 108 on the processor 102 with respect to a model that holds that memory access is desirably not conditional upon the data 110 input to the cryptographic component 108. Therefore, the analysis component 114 can be configured to analyze memory accesses corresponding to execution of the cryptographic component 108 over different input data. The analysis component 114 can then compare execution of the cryptographic component 108 over different input data to determine if program flow or memory access is dependent upon data that is desirably kept secret from third parties.

In an example embodiment, a programming API can be developed that can be utilized in connection with allowing the system 100 to be programmatically controlled by another program. For example, the programming API can be implemented to cause the system 100 to be controllable in a testing framework.

Figure 2:
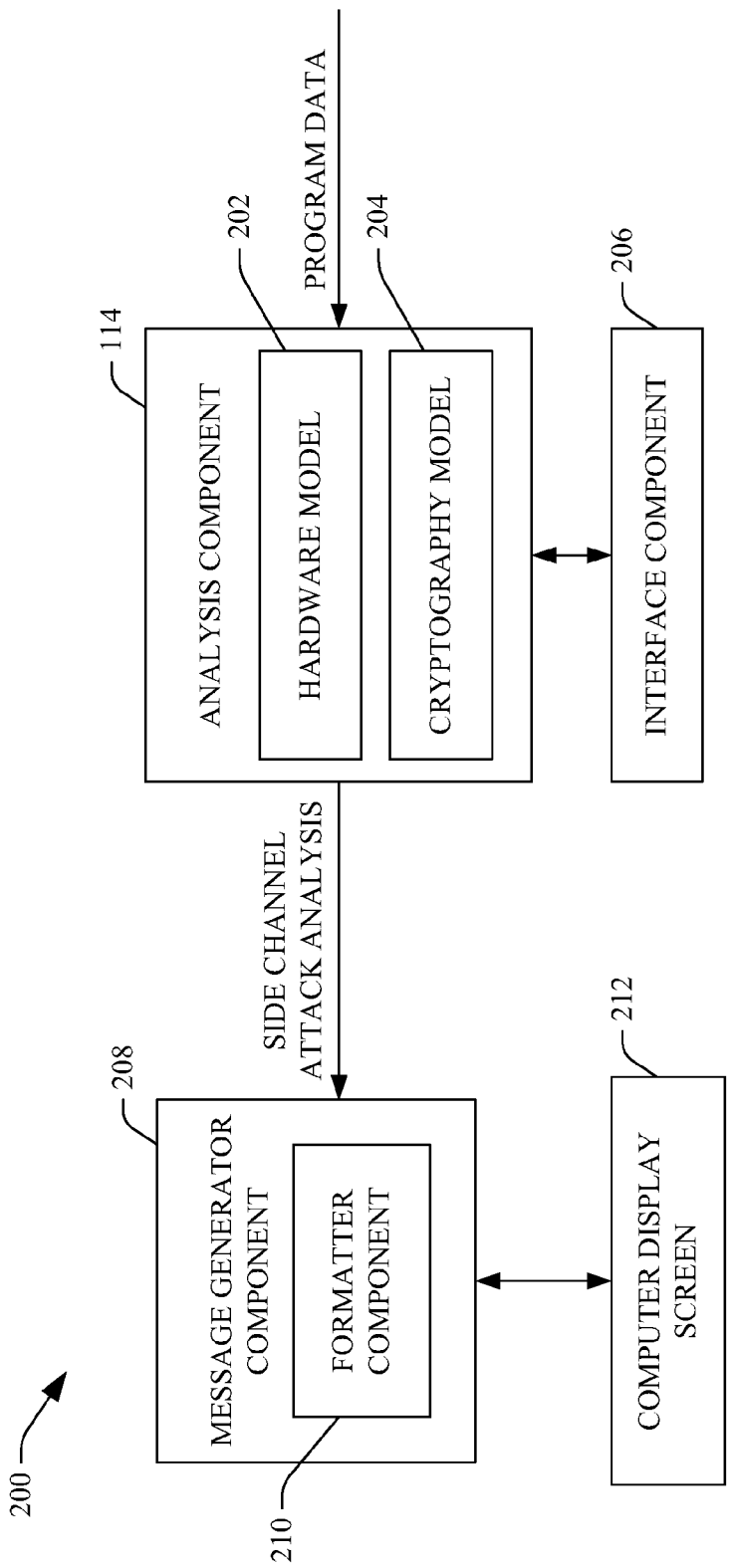
FIG. 2 is a functional block diagram of an example system that facilitates formatting for display side channel attack analysis of a cryptographic function.

Now referring to FIG. 2, an example system 200 that facilitates performing a side channel attack analysis with respect to a cryptographic function executing on a processor is illustrated. The system 200 comprises the analysis component 114 that receives the data packet generated by the monitor component 112 (not shown). In an example, the analysis component 114 can include or have access to a hardware model 202, which can model a physical parameter of computer hardware that is utilized to execute a cryptographic function. This hardware model 202 may thus be a model, for instance, of power consumed during execution of certain instructions by a processor, sound emitted during execution of certain instructions by the processor, timing required to execute particular instructions, heat emitted by a processor when executing certain instructions or other suitable physical parameters. In other examples the hardware model 202 may be a model of a cache in memory such that the analysis module 114 can analyze instructions executed by a processor with respect to hits or misses to a cache. Furthermore, the hardware model 202 may be a model of memory on a computing device such that the analysis component 114 could be configured to analyze memory accesses made by a processor when executing a cryptographic function, etc.

In another example, the analysis component 114 may comprise or have access to a cryptographic model 204, wherein the cryptographic model 204 can be a theoretical model of how a cryptographic function desirably executes on a computing device with respect to data. For instance, a theoretical model may be the program counter model which was described above. The analysis component 114 may then be configured to analyze a program counter to ensure that the program counter advances in a substantially similar manner when the cryptographic function is executed over different input data. Another theoretical cryptographic model 204 can be a model that indicates that memory access when executing the cryptographic function is to be predictable (patterned) regardless of the data being encrypted through utilization of such cryptographic function. It is to be understood that the cryptographic model 204 may be any suitable theoretical model that can be indicative of how a cryptographic function interacts with hardware of a computing device when utilized to encrypt data.

An interface component 206 can be in communication with the analysis component 114 and can be utilized by a tester of a cryptographic function to indicate which type of analysis is desirably performed on the cryptographic function. For example, the interface component 206 may be or include a mouse, a keyboard, a display screen, a microphone or other suitable component that can be configured to interact with the analysis component 114.

A message generator component 208 can receive data output by the analysis component 114 and can format such data for display to the tester on a computer display screen 210. The computer display screen 210 may be any suitable display including but not limited to a flat panel display, a CRT display, a plasma display, a LCD display or the like. In an example, the message generator component 208 can receive side channel attack analysis from the analysis component 114 that comprises a data packet which is a simulation of a side channel attack with respect to a cryptographic function executing on a processor. The message generator component 208 can comprise a formatter component 210 that formats such data in a manner that is desirable to the tester of the cryptographic function. For instance, the formatter component 210 can display the side channel in a graphical manner on the computer display screen 210. Thus, a tester can receive a quick visual indication of how the cryptographic function executes on the computer device. Of course, data output by the analysis component 114 can be caused to be stored in a non-transitory computer-readable medium such as a hard drive, memory, disk, etc.

In another example, the formatter component 210 may be configured to intelligently format data to the tester. For instance the formatter component 210 can perform some analysis on the data output by the analysis component 114 to provide the tester with detailed results of the testing of the cryptographic function. Accordingly, the formatter component 210 can be configured to analyze data output by the analysis component and indicate to the tester that the cryptographic function has some sort of design flaw (e.g., "your cryptographic function is subject to a side channel timing attack"). Furthermore, the formatter component 210 may be equipped with intelligence to provide suggestions to the tester of how to alter the cryptographic function to reduce the probability of success of a side channel attack (e.g., "remove X number of conditional branches in the cryptographic function"). Of course, other types of detailed analysis can be undertaken by the formatter component 210 and are contemplated by the inventors and are intended to fall under the scope of the hereto appended claims.

Figure 3:
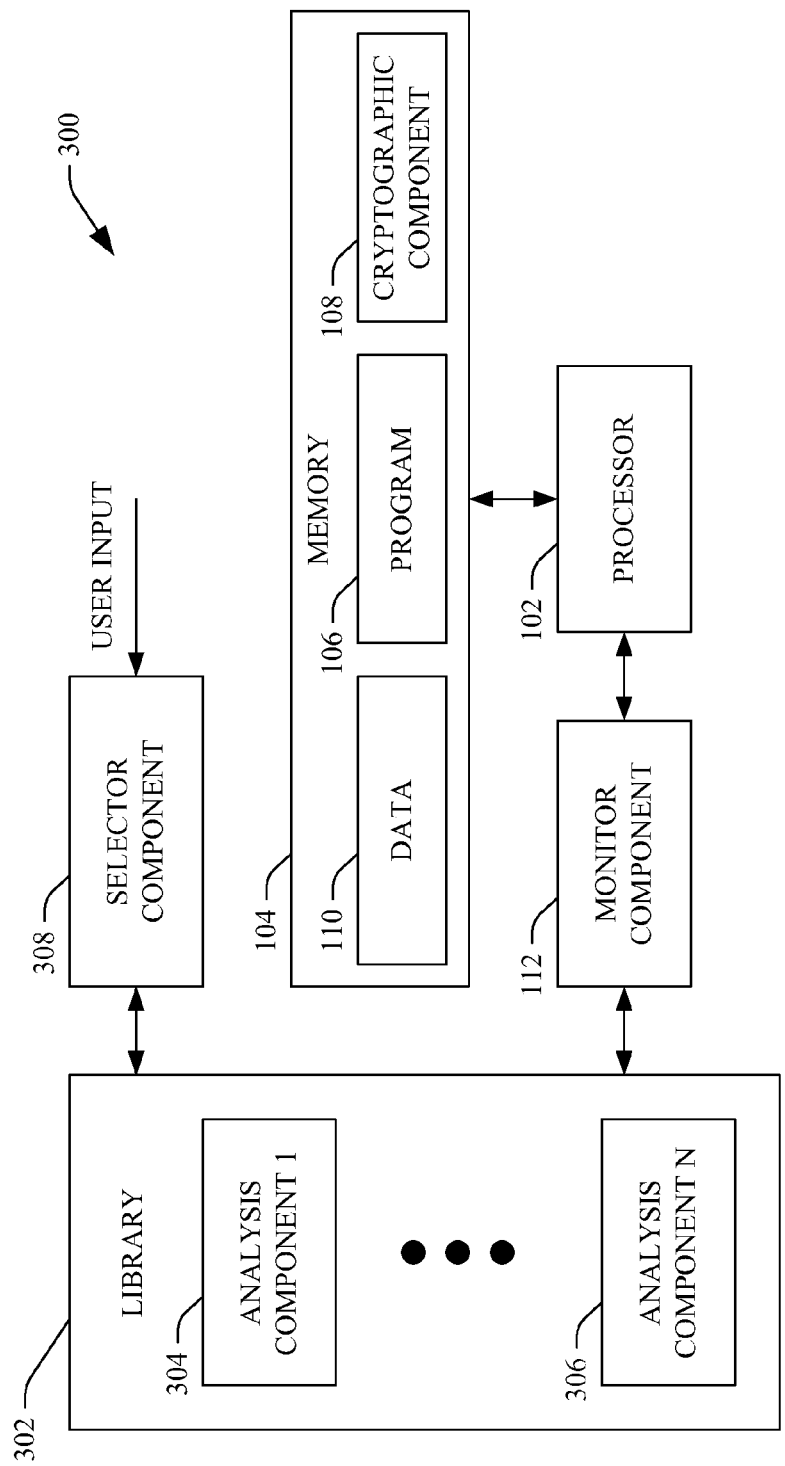
FIG. 3 is a functional block diagram of an example system that facilitates allowing a user to select an analysis module from amongst a plurality of analysis modules for performing side channel attack analysis on a cryptographic function.

Referring now to FIG. 3, an example system 300 that facilitates performing a side channel attack analysis on a cryptographic function executing on a processor in a computing device is illustrated. The system 300 comprises the monitor component 112 which operates as described above. The system 300 further comprises a library 302 that includes a plurality of analysis components 304-306. The analysis components 304-306 may be configured to simulate different side channel attacks with respect to the cryptographic component 108 and/or analyze data output by the monitor component 112 with respect to different theoretical models as described above. Furthermore, new analysis components can be added to the library 302 as new theoretical models are proposed, as new models of physical parameters of hardware of the computing device are generated, and/or as new side channel attacks are mounted on cryptographic functions. Thus, a programming framework is contemplated, such that new and different analysis modules can be plugged into the framework such that the analysis modules are accessible to testers by way of the library 302.

The system 300 can further include a selector component 308 that allows a tester to select one or more of the analysis components 304-306 from the library 302 in order to test the cryptographic component 108 with respect to one or more side channel attacks or determine if implementation of the cryptographic component 108 on a computing device sufficiently conforms to a theoretical model. Thus, for instance, if the tester wishes to test the cryptographic component 108 with respect to a timing attack, the tester could utilize the selector component 308 to select an analysis component from the library 302 that simulates timing attacks on hardware used to execute the cryptographic function (the cryptographic component 108). In another example, the tester may wish to understand how the implementation of the cryptographic component 108 stacks up with a particular theoretical model and the tester could utilize the selector component 308 to select an analysis component that analyzes the implementation of the cryptographic component 108 with respect to the theoretical model.

Figure 4:
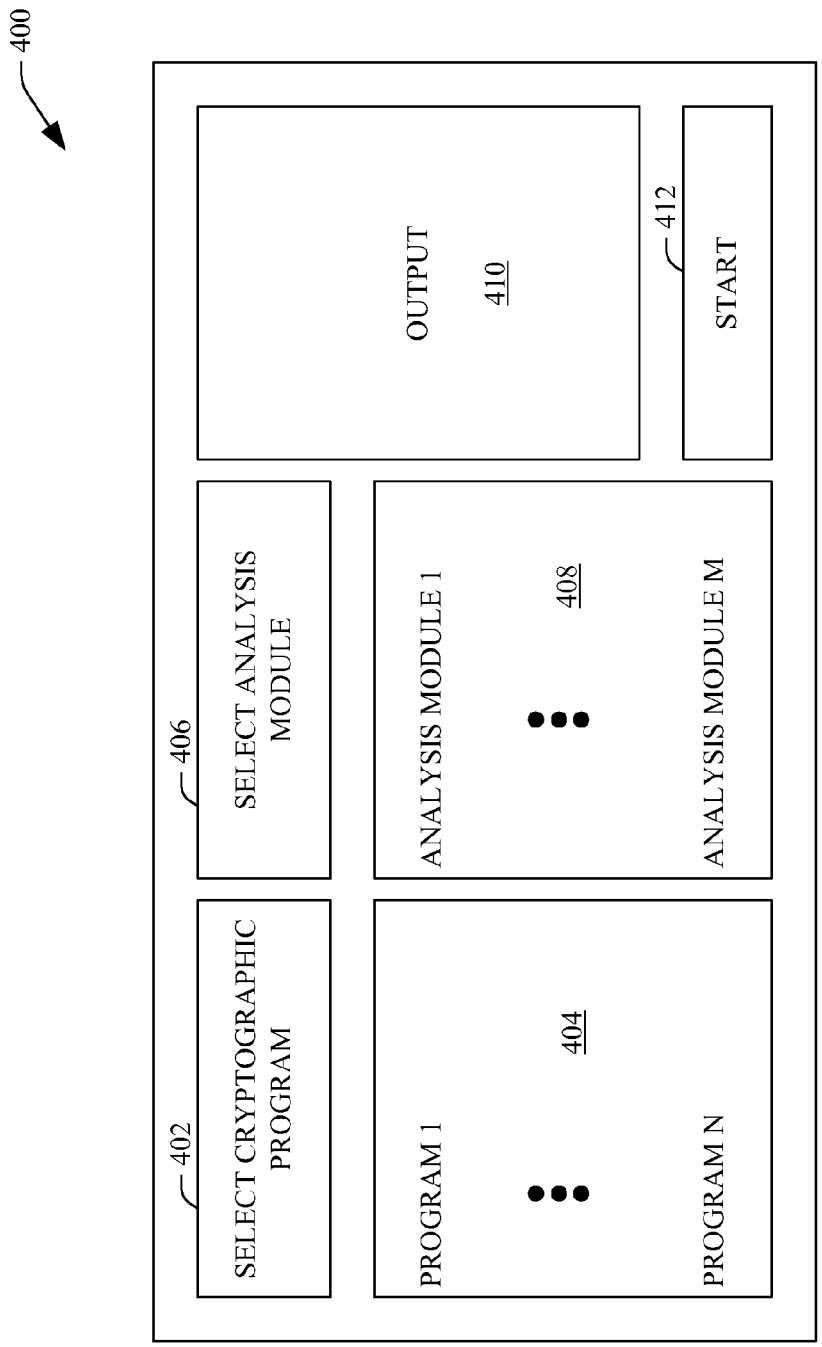
FIG. 4 is an example graphical user interface.

Referring now to FIG. 4, an example graphical user interface 400 is illustrated, wherein the graphical user interface can be utilized in connection with performing side channel analysis with respect to a cryptographic program/function executing on a computing device. The graphical user interface includes a first field 402 that comprises graphics or text that indicates to a tester that the tester is to select a particular cryptographic program. A second field 404 can comprise a plurality of selectable cryptographic programs, wherein the tester can utilize a pointing and clicking mechanism, for instance, to select a particular cryptographic program that is desirably analyzed.

The graphical user interface 400 further includes a third field 406 that comprises text or graphics that indicate that the tester is to select a particular analysis component from a plurality of selectable analysis components. A fourth field 408 includes a selectable list of analysis components, wherein each of the analysis components can be configured to perform a different type of side channel attack analysis. A fifth field 410 can display output of the analysis, which may be data, a message, graphical outputs pertaining to the side channel attack analysis, etc. Furthermore the graphical user interface 400 can include a start button 412, wherein the user can initiate testing of the cryptographic function by selecting the start button 412 after the tester has selected a program from the list of programs in the second field 404 and at least one analysis module in the list of analysis modules in the fourth field 408.

Figure 5:
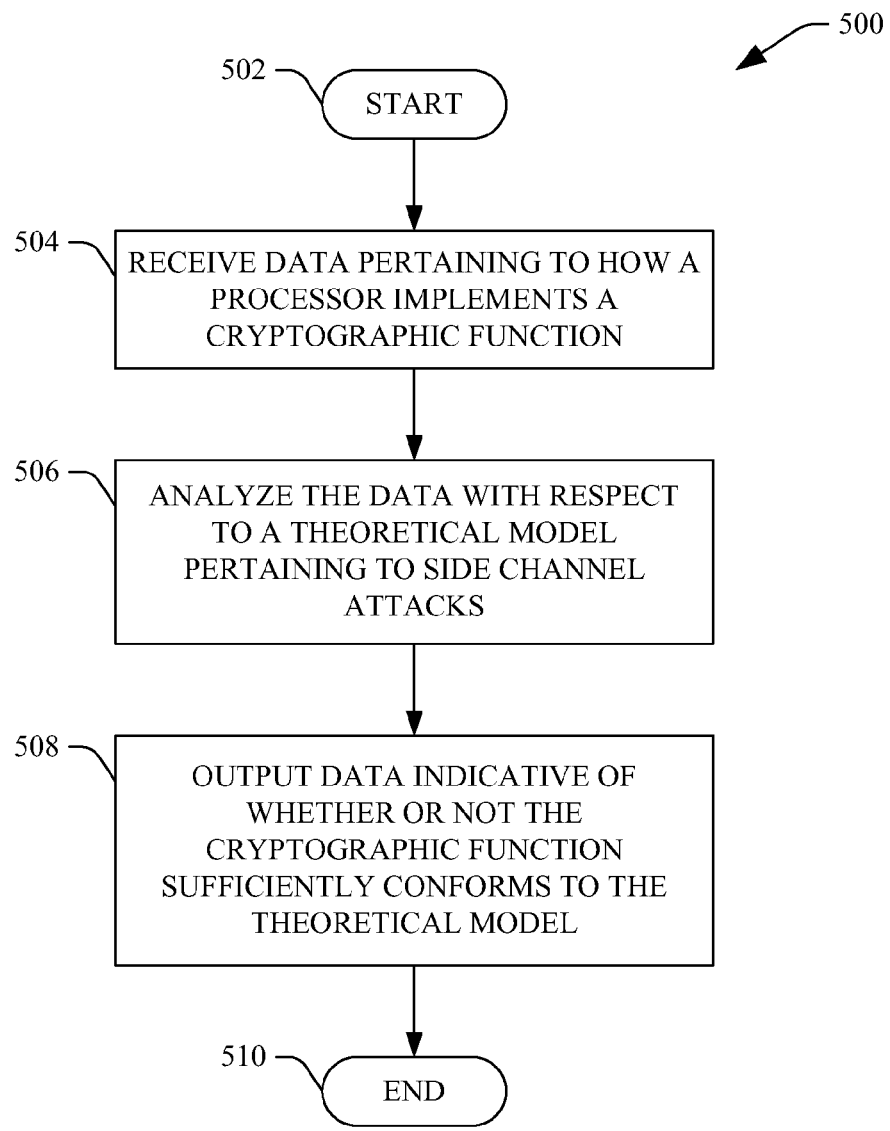
FIG. 5 is a flow diagram that illustrates an example methodology for performing side channel attack analysis on a cryptographic function.
Figure 6:
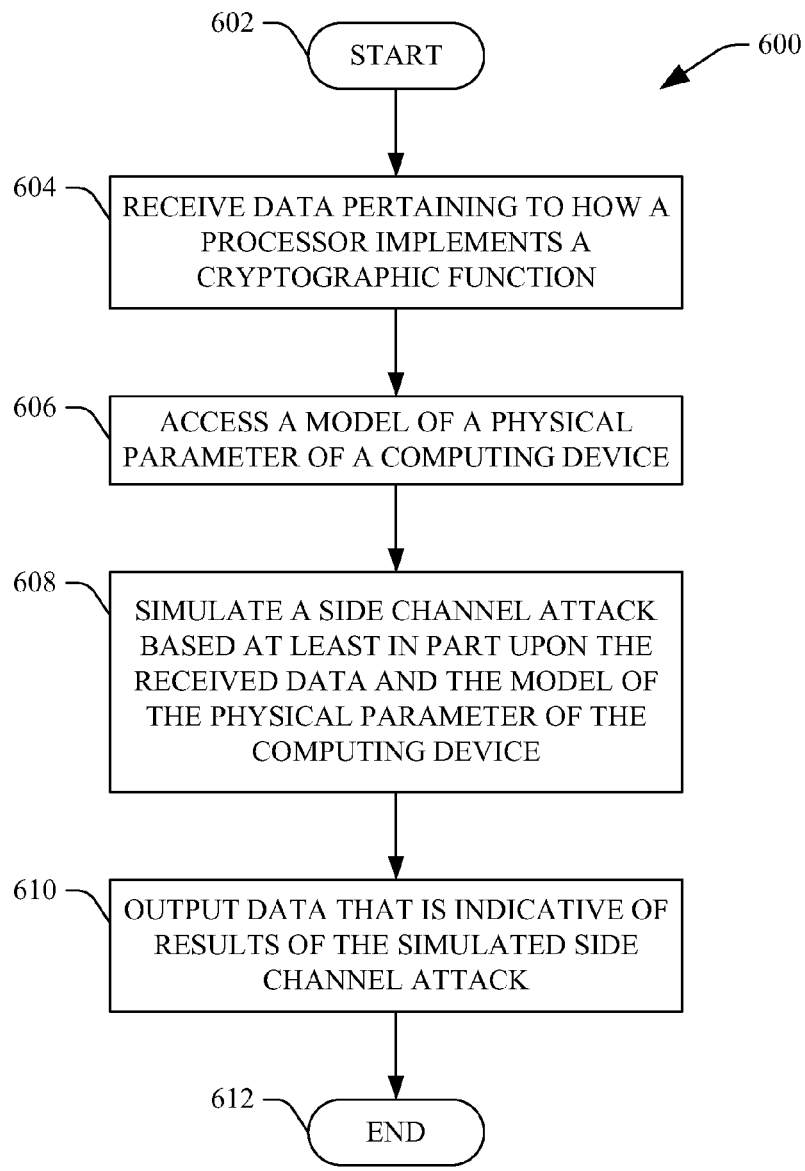
FIG. 6 is a flow diagram that illustrates an example methodology for simulating a side channel attack.
Figure 7:
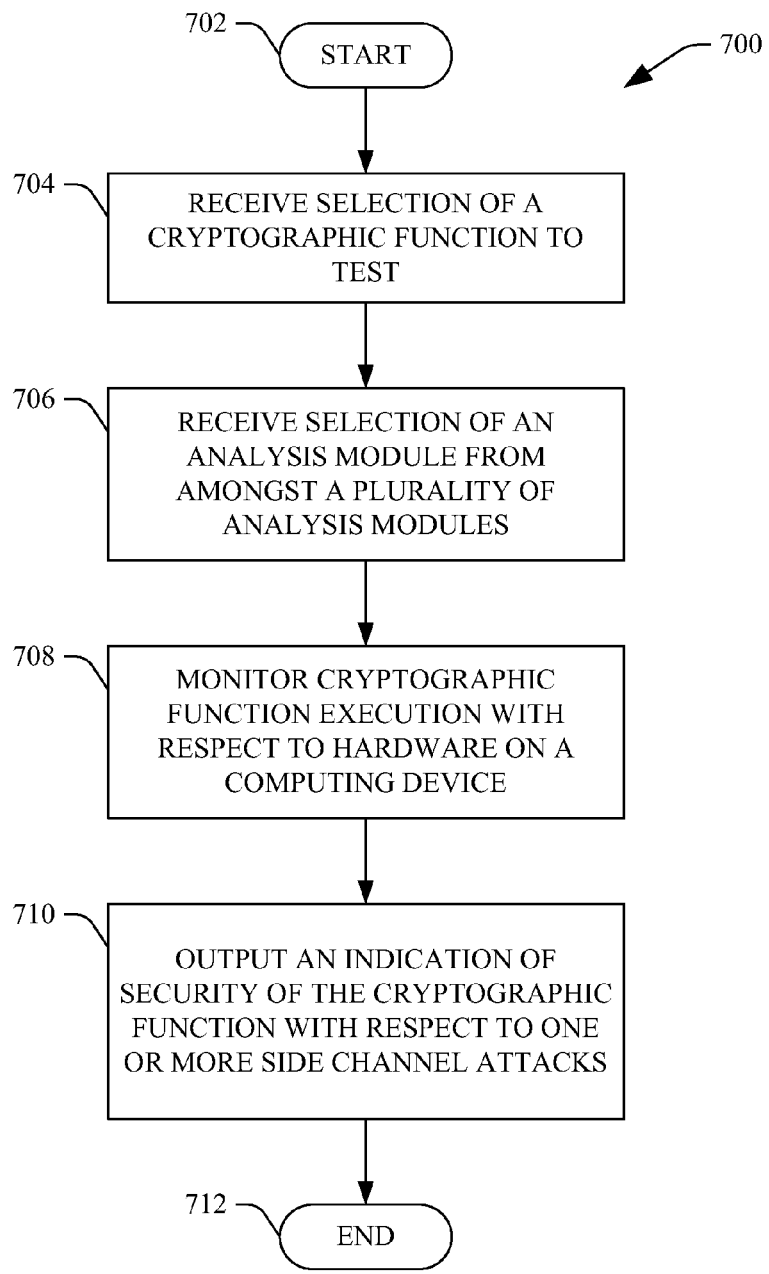
FIG. 7 is a flow diagram that illustrates an example methodology for performing a side channel attack analysis with respect to a cryptographic function.

With reference now to FIGS. 5-7, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be a non-transitory medium, such as memory, disk, or the like. Still further, the methods may be configured for implementation on a mobile computing device, such as a mobile telephone, a desktop computing device, a server, or the like.

Referring now solely to FIG. 5, a methodology 500 that facilitates performing a side channel attack analysis with respect to a cryptographic function is illustrated. The methodology 500 begins at 502, and at 504 data is received pertaining to how a processor implements a cryptographic function with respect to input data. The data can be received from a program that monitors processor states as the cryptographic function is executed by the processor. For instance such program may be implemented through utilization of a tracing utility API such as a debugger API.

At 506, the data received at 504 is analyzed with respect to a theoretical model pertaining to side channel attacks. Such theoretical model may pertain to an idealized manner in which a cryptographic function is implemented on hardware. At 508, data is output that is indicative of whether or not the cryptographic function sufficiently conforms to the theoretical model. For instance, the data may be in a form of a graph that indicates whether or not the cryptographic function implemented on certain hardware sufficiently accords to the theoretical model. In another example, the data that is indicative of whether or not the cryptographic function accords to the theoretical model may be in the form of text that indicates (e.g., by percentage match) how well the implementation of the cryptographic function of a computing system accords to the theoretical model, etc. In another example embodiment, a command line tool can be utilized to receive input from a tester, wherein such input can be a specification of a cryptographic function to test, an analysis module to utilize to test the cryptographic function, and a type of output (e.g., file, text, . . . ). The methodology 500 completes at 510.

Turning now to FIG. 6, an example methodology 600 that facilitates analyzing a cryptographic function with respect to one or more side channel attacks is illustrated. The methodology starts at 602, and at 604 data is received pertaining to how a processor implements a cryptographic function. This data can include memory accesses by a processor, timing information corresponding to instructions executed by the processor, identity of instructions executed by the processor, etc. At 606, a model of a physical parameter of a computing device that includes the processor is accessed. For instance, this model may describe timing information corresponding to how long it takes the processor to execute certain instructions, power data indicating an amount of power utilized by the processor to execute certain instructions, amongst other data.

At 608, a side channel attack is simulated based at least in part upon the received data and the model of the physical parameter of the computing device. At 610, data is output that is indicative of results of the simulated side channel attack. For example, the data may be the simulated side channel attack (an estimated amount of power utilized when executing certain instructions). In another example, the data that is indicative of results of the simulated side channel attack may be in the form of a graph, a message desirably transmitted to a tester of the cryptographic function, etc. The methodology 600 completes at 612.

Referring now to FIG. 7, an example methodology that facilitates performing a side channel attack analysis on a cryptographic function is illustrated. The methodology 700 starts at 702 and at 704 a selection of a cryptographic function is received, wherein such selection indicates that the cryptographic function is desirably tested with respect to one or more side channel attacks or theoretical models that are designed to mitigate side channel attacks.

At 706, a selection of an analysis module from amongst a plurality of analysis modules is received from the tester. For instance, the tester may select an analysis module that is configured to simulate a side channel attack. In another example, the selection from the tester may be for an analysis module that is configured to analyze implementation of a cryptographic function on a particular computing device with respect to a theoretical model that is configured to mitigate side channel attacks.

At 708, execution of a cryptographic function with respect to hardware on a computing device is monitored. As described above, this monitoring of the execution of the cryptographic function can include outputting each state of a processor as the processor executes instructions pertaining to the cryptographic function. At 710, an indication of security of a cryptographic function with respect to one or more side channel attacks is output. This indication of security may be in the form of raw data (e.g., a simulated side channel attack), an indication of how well the implementation of the cryptographic function accords to a theoretical idealized model, a graphical indication of how well the cryptographic function is secure against one or more side channel attacks, etc. The methodology 700 completes at 712.

Figure 8:
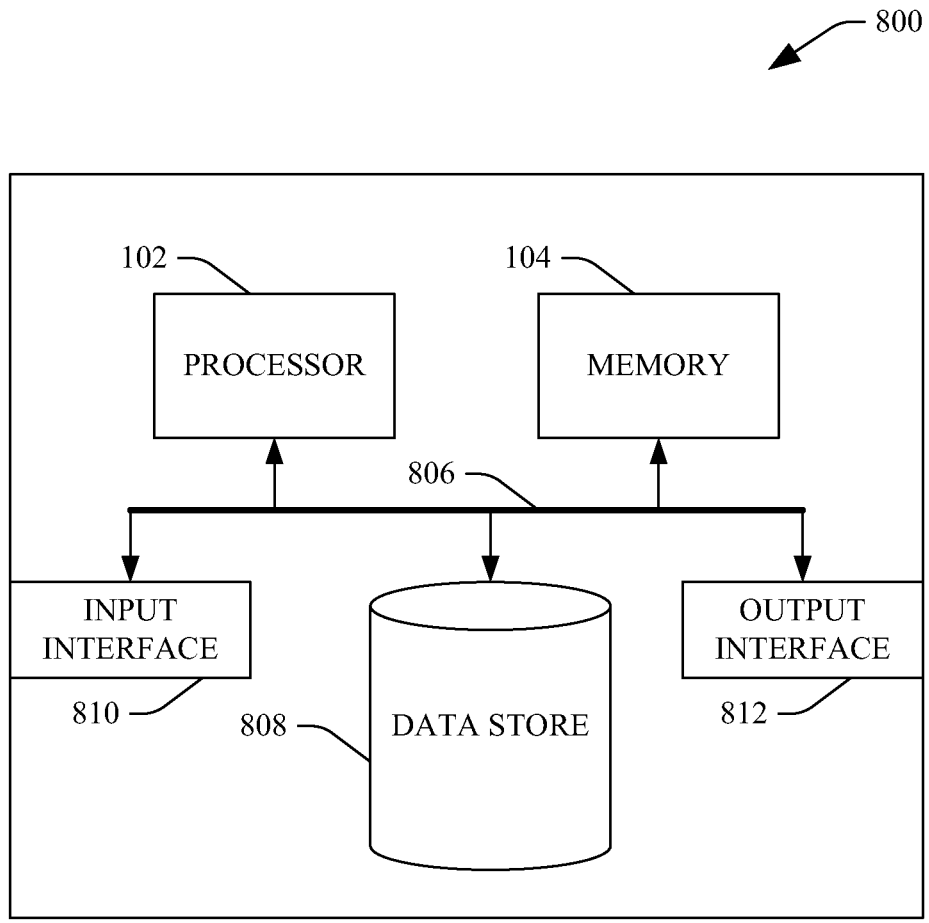
FIG. 8 is an example computing system.

Now referring to FIG. 8, a high-level illustration of an example computing device 800 that can be used in accordance with the systems and methodologies disclosed herein is illustrated. For instance, the computing device 800 may be used in a system that supports simulating a side channel attack with respect to a cryptographic function. In another example, at least a portion of the computing device 800 may be used in a system that supports analyzing a cryptographic function implemented on a computing device with respect to an idealized theoretical model. The computing device 800 includes the processor 102 that executes instructions that are stored in the memory 104. The memory 104 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 102 may access the memory 104 by way of a system bus 806. In addition to storing executable instructions, the memory 104 may also store theoretical models, models of physical parameters of a computing device, etc.

The computing device 800 additionally includes a data store 808 that is accessible by the processor 102 by way of the system bus 806. The data store 808 may be or include any suitable computer-readable storage, including a hard disk, memory, etc. The data store 808 may include executable instructions, theoretical models, models of physical parameters of computing devices, etc. The computing device 800 also includes an input interface 810 that allows external devices to communicate with the computing device 800. For instance, the input interface 810 may be used to receive instructions from an external computer device, from an individual, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:
   executing a cryptographic function over input data utilizing a processor on a computing device;
   generating a data packet that indicates how the cryptographic function interacts with hardware of the computing device, wherein the data packet comprises a software trace indicating a number of memory accesses pertaining to execution of the cryptographic function;
   accessing a model of a physical parameter of the processor;
   simulating a side channel attack on the cryptographic function based at least in part upon the model of the physical parameter of the processor and the data packet; and
   generating an indication of security of the cryptographic function with respect to the side channel attack based at least in part upon the simulating of the side channel attack on the cryptographic function.

2. The method of claim 1, further comprising analyzing the data packet with respect to a theoretical model of implementation of cryptographic functions, and wherein generating the indication of security of the cryptographic function with respect to the side channel attack comprises generating an indication of whether the cryptographic function executed by the processor accords to the theoretical model.

3. The method of claim 1, wherein the side channel attack is one of a timing attack, an acoustic attack, or a power attack.

4. The method of claim 1 configured for execution on a mobile computing device.

5. The method of claim 1 configured for execution on a desktop computing device or a server.

6. The method of claim 1, further comprising:
receiving a selection of an analysis module from amongst a plurality of analysis modules from a tester; and
utilizing the analysis module selected by the tester to generate the indication of security of the cryptographic function with respect to the side channel attack.

7. The method of claim 1, wherein a debugger is configured to generate the data packet that indicates how the cryptographic function interacts with the hardware of the computing device.

8. The method of claim 1, wherein simulating the side channel attack on the cryptographic function comprises simulating power consumption of the processor when the processor executes instructions pertaining to the cryptographic function.

9. The method of claim 1, further comprising causing a message to be displayed to a tester of the cryptographic function on a display screen in communication with the computing device, wherein the message is indicative of whether the cryptographic function is secure with respect to the side channel attack.

10. The method of claim 1, wherein the cryptographic function is called by one of the following protocols: SSL, TLS, Kerberos, or LSA.

11. The method of claim 1, wherein analyzing the data packet comprises comparing execution of the cryptographic function on the computing device with a theoretical program counter model.

12. A system comprising the following computer-executable components:
a monitor component that generates data that indicates how a cryptographic function interacts with hardware on a computing device when a processor on the computing device executes the cryptographic function,
wherein the data comprises a software trace that indicates a number of memory accesses pertaining to execution of the cryptographic function; and
an analysis component that performs a side channel attack analysis on the data generated by the monitor component,
wherein the analysis component accesses a model of a physical parameter of the processor and simulates a side channel attack based at least in part upon the data generated by the monitor component and the model of the physical parameter of the processor.

13. The system of claim 12, wherein the analysis component accesses a theoretical model of hardware interaction with cryptographic functions and outputs an indication of whether execution of the cryptographic function on the computing device accords to the theoretical model.

14. The system of claim of claim 13, wherein the theoretical model of hardware interaction indicates that a program counter advances in a predictable manner while executing any cryptographic function regardless of data upon which the cryptographic function executes.

15. The system of claim 12, wherein the data comprises a software trace.

16. The system of claim 12, further comprising a message generator component that outputs a graphical indication of security of the cryptographic function with respect to the side channel attack to a display screen of the computing device.

17. A computer-readable data storage device comprising instructions that, when executed by a processor, cause the processor to perform acts comprising:
generating a software trace that comprises at least one processor instruction pertaining to execution of a cryptographic function on a dataset in a computing device;
accessing a computer-implemented model of a physical parameter associated with operation of the computing device, wherein the computer-implemented model indicates existence of the physical parameter in response to execution of a processor instruction;
applying the computer-implemented model of the physical parameter to the software trace; and
determining security of the cryptograph function with respect to a side channel attack, wherein the determining is based at least in part on assessing existence of the physical parameter as indicated by applying the computer-implemented model to the software trace.

18. The system of claim 12, wherein the analysis component simulates cache hits and misses when the cryptographic function is executed by the processor.

19. The method of claim 1, wherein the simulating of the side side channel attack on the cryptographic function is a simulation of cache hits and misses, and is based at least in part upon the memory accesses pertaining to execution of the cryptographic function in the data packet.

* * * * *